United States Patent
Belzner et al.

(10) Patent No.: US 6,599,083 B2
(45) Date of Patent: Jul. 29, 2003

(54) COOLING SYSTEM AND METHOD FOR COOLING A TURBO-MACHINE HOUSING

(75) Inventors: Andreas Belzner, Bad Saeckingen (DE); Fred Boehm, Baden-Daettwil (CH); Burkhard Josuhn-Kadner, Schopfheim (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 10/006,696

(22) Filed: Dec. 10, 2001

(65) Prior Publication Data

US 2002/0154990 A1 Oct. 24, 2002

(30) Foreign Application Priority Data

Dec. 23, 2000 (DE) .......................................... 100 64 895

(51) Int. Cl.[7] .............................................. F01D 25/12
(52) U.S. Cl. ..................... 415/1; 415/116; 415/149.1; 415/155; 415/175
(58) Field of Search ........................ 415/1, 116, 149.1, 415/155, 175; 60/785, 806

(56) References Cited

U.S. PATENT DOCUMENTS

| | | | | |
|---|---|---|---|---|
| 4,967,552 A | * | 11/1990 | Kumata et al. | ............... 60/806 |
| 5,388,960 A | * | 2/1995 | Suzuki et al. | ............... 415/176 |
| 6,082,094 A | * | 7/2000 | Longardner et al. | ........... 60/801 |
| 6,357,221 B1 | * | 3/2002 | Schroeder et al. | ............. 60/797 |

FOREIGN PATENT DOCUMENTS

| | | |
|---|---|---|
| DE | 1 034 193 B | 7/1958 |
| DE | 43 36 143 A1 | 5/1995 |

* cited by examiner

*Primary Examiner*—Ninh Nguyen
(74) *Attorney, Agent, or Firm*—Burns, Doane, Swecker & Mathis, L.L.P.

(57) ABSTRACT

A cooling system for cooling a housing of a turbo-machine comprising a feeder air line connected to the feeder air connection of the housing, a waste air line connected to the waste air connection of the housing, a recirculating air line, a fan position in the feeder air line, and means for changing feeder air temperature including a controller to control the air flow in the air lines.

12 Claims, 1 Drawing Sheet

COOLING SYSTEM AND METHOD FOR COOLING A TURBO-MACHINE HOUSING

FIELD OF THE INVENTION

The invention relates to a cooling system as well as a method for cooling thermally stressed housings or housing parts in turbo-machines, in particular in a turbine.

BACKGROUND OF THE INVENTION

In order to cool a housing or housing parts of a turbo-machine, in particular that of a turbine, feeder air, which is usually sucked in from the area around the housing, is fed into the housing. When flowing through the housing, this air is then heated and is removed from the housing as waste air. For this purpose, a conventional cooling system has a feeder air line that connects a feeder air connection of the housing with an area around the housing in order to feed the feeder air through the feeder air line into the housing. Also provided is a waste air line that is connected with a waste air connection of the housing in order to remove the waste air heated by the housing. A fan that circulates the cooling air flow is positioned inside the feeder air line. In order to influence the cooling performance of such a cooling system, it is known to change the speed of the fan, for example by means of a gear. In the same way, the use of closing elements, such as, for example, butterfly valves, gate valves, or shutter-type valves, are known, with which the cooling air flow or parts thereof can be influenced or locked out. By means of these measures, the air volume fed into the housing for cooling, i.e. the feeder air volume, is therefore adjusted in order to change the cooling performance of the cooling system.

In order for the cooling of the housing to be able to function properly, clear and reproducible flow conditions must exist during the flow through the housing. This is only possible, however, if the added feeder air does not vary too much from a cooling air volume on which the design of the cooling system is based. This means that only a relatively small adjustment range is available for changing the feeder air volume. Furthermore, a temperature gradient that may result in undesired tensions in the housing forms along the flow path within the housing.

SUMMARY OF THE INVENTION

The invention intends to remedy this. The invention at hand relates to the objective of disclosing an embodiment for a cooling system or respectively for a method of the initially mentioned type, which enables an adjustment of the cooling performance within a relatively large range. In addition, a possibility for reducing the temperature gradient along the flow path in the housing should be disclosed.

The invention is based on the general idea of changing the cooling performance by way of the temperature of the added feeder air. In order to make it possible for the flow conditions to remain principally unchanged during the flow through the housing, the cooling performance of the cooling system can be adjusted by changing the feeder air temperature within a very large range. With an increase in the temperature of the feeder, it is also possible to reduce the temperature gradient forming along the flow path in the housing, so that undesired tensions in the housing are reduced or avoided.

The means for changing the feeder temperature may comprise, for example, an appropriate heating device and/or cooling device that may be positioned upstream or downstream from the fan in the feeder air line. Such a cooling and/or heating device can also be integrated in the fan.

However, preferred is an embodiment in which the means for changing the feeder air temperature comprise a recirculated air line that connects the feeder air line upstream from the fan with the waste air line, whereby an adjustable recirculated air lock-out element is positioned in this recirculated air line. In this embodiment, the feeder air temperature is changed by mixing more or less waste air with the feeder air. The more waste air is mixed with the feeder air, the higher the feeder air temperature is. A crucial advantage of this embodiment is that the increase of the feeder air temperature does not increase additional energy, since the required heat is removed from the waste air. Such an embodiment can also be realized at relatively low cost.

In a useful further development, the fan may be constructed so that the air volume circulated by the fan is adjustable. The actually known measure for changing the cooling performance is hereby combined with the measure according to the invention that acts in the same way, resulting in additional adjustment possibilities.

In a further embodiment, an adjustable waste air closing element may be positioned in the waste air line downstream from the recirculated air line. Alternatively, or additionally, an adjustable feeder air closing element may be positioned in the feeder air line upstream from the recirculated air line. This means that the recirculated air closing element is open and the waste air closing element is closed and/or the feeder air closing element is closed, a purely recirculated air operating mode can be set, during which the cooling performance is obtained essentially through leaks or convection heat emission.

Here also, the invention is based on the general idea of influencing the cooling performance via the feeder air temperature.

Other important characteristics and advantages of the invention are found in the secondary claims, the drawing, and the related description of the drawing,

BRIEF DESCRIPTION OF THE DRAWING

A preferred embodiment of the invention is disclosed in the following description and illustrated in the accompanying drawing, in which.

DETAILED DESCRIPTION OF THE INVENTION

Figure 1:
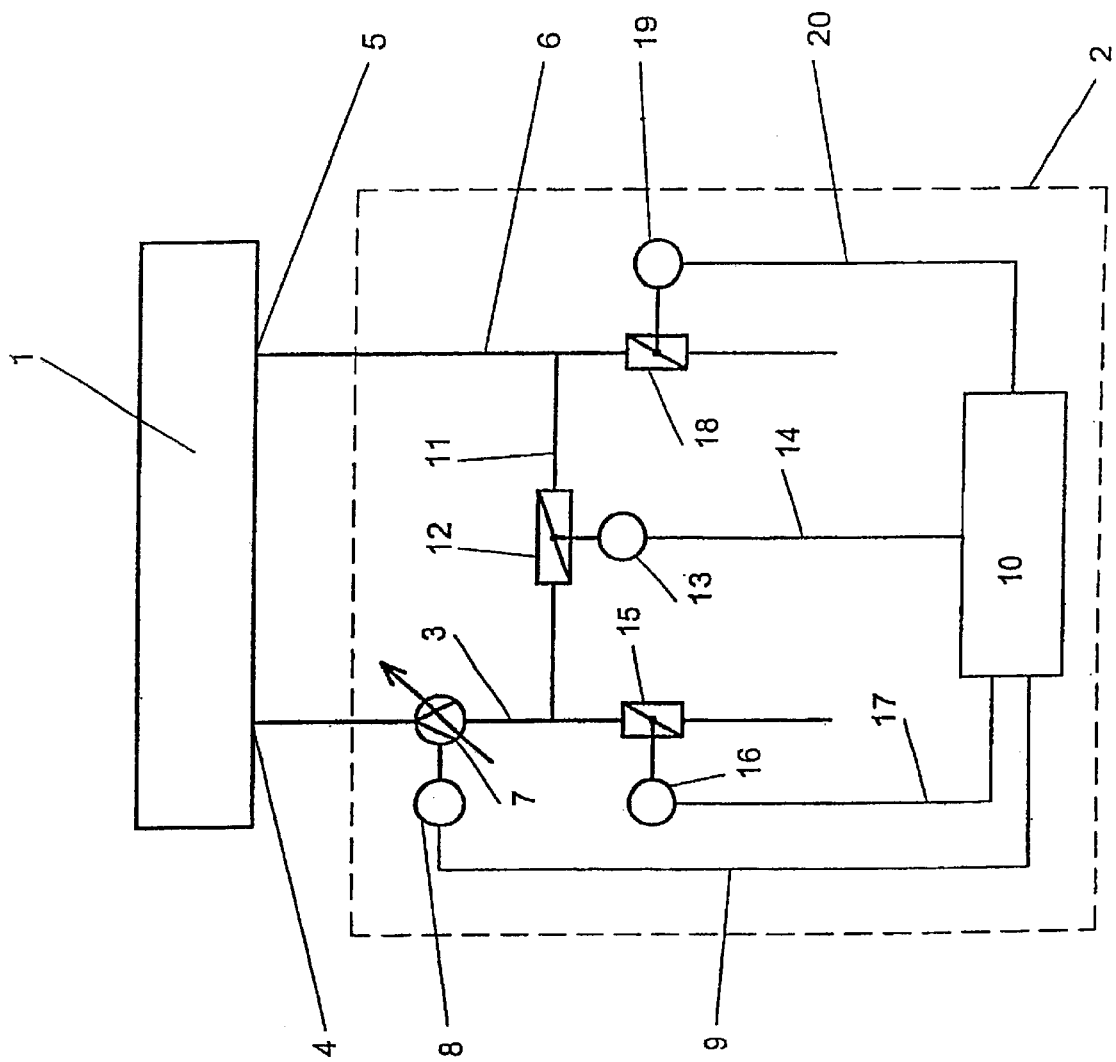
FIG. 1 shows a schematic view of a cooling system according to an embodiment of the invention.

FIG. 1 is an illustration of a housing or housing part 1 in a turbo-machine, (not shown) (otherwise), for example a turbine, indicated by a rectangle. The housing 1 is cooled using a cooling system 2 according to the invention. For this purpose, the cooling system 2 comprises a feeder air line 3 that is connected to a feeder air connection 4 of the housing 1. Inside the housing 1, a flow path, (not shown), is realized, which communicates on the inlet side with the feeder air connection 4 and on the outlet side with a waste air connection 5 of the housing 1. To this waste air connection 5, a waste air line 6 of the cooling system 2 is connected. In the feeder air line 3, a fan 7 is positioned whose drive motor 8 can be operated via a control line 9 from a control device 10 of the cooling system 2. In the embodiment illustrated here, the fan 7 can be adjusted with respect to its fan output. For example, the air mass circulated by the fan 7 can be adjusted by way of the speed of the drive motor 8.

The cooling system 2 furthermore comprises a recirculated air line 11, with which the feeder air line 3 is connected upstream from the fan 7 with the waste air line 6. In this recirculated air line 11 is positioned a recirculated air closing element 12 that can be adjusted by means of an associated control element 13. The control element 13 is again operated via corresponding control line 14 that is connected with the control device 10. The control element 13 in particular can be used to adjust the opening cross-section of the recirculated air closing element 12 between a completely locked locking position and a completely open opening position, whereby at least one intermediate position can also be set.

In the feeder air line 3, a feeder air closing element 15 is positioned upstream from the recirculated air line 11, which feeder air closing element can be adjusted by way of an associated control element 16 that is operable via a control line 17 again from the control device 10. The feeder air closing element 15 preferably can also be adjusted between a completely open opening position and a completely closed closing position, whereby at least one intermediate position can also be set.

In the waste air line 6, a waste air closing element 18 that can be adjusted via an associated control element 19 between a completely closed closing position and a completely open opening position Is positioned downstream from the recirculated air line 11, whereby preferably at least one intermediate position can also be set here. The control element 19 can also be operated from the control device 10 via a control line 20.

The housing 1 is cooled as follows using the cooling system 2 according to the invention:

The control device 10 enables an operating mode A during which the recirculated air closing element 12 is closed and during which the feeder air closing element 15 and the waste air closing element 18 are open. In this operating mode A, the cooling system 2 according to the invention therefore functions like a conventional cooling system: Via the feeder air line 3, fresh air is sucked from an area around the housing 1 and is fed through the feeder air connection 4 to the housing 1. Inside the housing 1, the feeder air circulated in this manner follows the flow path, in the process cooling the housing 1, whereby the circulated air is heated. The heated waste air exits the housing 1 through the waste air connection S and is transported off through the waste air line 6. The waste air, for example, can be circulated again via a heat exchanger into the area around the housing 1. In operating mode A, relative small variations of the cooling performance can be realized by way of a corresponding change of the feeder air volume circulated by the fan 7. In operating mode A, the feeder air closing element 15 and the waste air closing element 18 are not necessary.

The control device 10 also enables an operating mode B in which the recirculated air closing element 12 is open, whereby the feeder air closing element 15 and the waste air closing element 18 initially remain completely open. Through this arrangement, feeder air reaches the suction side of the fan 7, so that waste air is mixed with the feeder air. Since the waste air has a higher temperature than the fresh air sucked in from the environment, the feeder air temperature can be increased. As more waste air mixes with the feeder air, feeder air temperature increases. By increasing the feeder air temperature, the cooling performance of the cooling system 2 is reduced. In operating mode B, the feeder air closing element 15 and the waste air closing element 18 are not used. In order to increase the content of waste air in the feeder air, the feeder air closing element 15 and/or the waste air closing element 18 additionally can be closed.

The control device 10 also enables an operating mode C during which the recirculated air closing element 12 is open, and during which the feeder air closing element 15 and/or the waste air closing element 18 is closed. This sets an almost purely recirculated operating mode for producing a minimal cooling performance. In operating mode C, either the feeder air lockout element 15 or the waste air lockout element 18 arc not used. However, in order to compensate for air losses due to leaks, a switching position is preferred for this recirculated operating mode in which the waste air closing element 18 is closed and the feeder air closing element 15 is open. During recirculated operating mode, the cooling of the housing 1 takes place essentially through leak volumes and convection heat emission of the housing 1.

Finally, the control device 10 also permits an operating mode D in which the recirculated air closing element 12 and the feeder air closing element 15 and/or the waste air closing element 18 are open. By setting various intermediate positions in the closing elements 12,15 and 18, different variations for a relatively fine adjustment of the feeder air temperature are possible.

In the cooling system 2 according to the invention, the cooling performance can be varied within a very broad range by influencing the feeder air temperature. In order to set a minimum feeder air temperature, i.e. for setting a maximum cooling performance, the closing elements 12,15 and IS are positioned so that no waste air is mixed into the feeder air. The feeder air then corresponds to the fresh air temperature. In order to set a maximum feeder air temperature, i.e. a minimum cooling performance, the closing elements 12,15 and 18 are positioned so that the entire waste air is mixed into the feeder air. The feeder air then essentially corresponds to the waste air temperature.

A further adjustment possibility for influencing the cooling performance of the cooling system 2 can be achieved in all operating modes A to D by way of a corresponding change in the air volume circulated by the fan 7.

It is useful that the dimensions of the cooling system 2 can be such that it already achieves the cooling performance necessary for the optimum operating point of the turbo-machine when the recirculated air closing element 12 is not completely closed. As a result of this design, the cooling system 2 has a large performance reserve that can be activated, for example, in an emergency. The same applies, analogously, to the fan output of the adjustable fan 7.

The closing elements 12,15 and 18 used hereby can be realized in an actually known manner as butterfly valves, gate valves, shutter-type valves, etc.

What is claimed is:

1. A cooling system for cooling thermally stressed housings or housing parts in a turbine, comprising a feeder air line that is connected with a feeder air connection of the turbine housing, a waste air line that is connected with a waste air connection of the turbine housing, and a fan positioned in the feeder air line, wherein means for changing the feeder air temperature are provided.

2. A cooling system according to claim 1, wherein the means for changing the feeder air temperature further comprises a recirculated air line that connects with the feeder air line upstream from the fan with the waste air line, whereby an adjustable recirculated closing element is positioned in the recirculated air line.

3. A cooling system according to claim 2, wherein an adjustable waste air closing element is positioned downstream from the recirculated air line in the waste air line.

4. A cooling system according to claim 2, an adjustable feeder air closing element is positioned upstream from the recirculated air line in the feeder air line.

5. A cooling system according to claim 2, wherein the cooling system further comprises:
   a control device, the control device being connected with adjustable components of the cooling system for operation, whereby the control device enables an operating mode (A), wherein the recirculated air closing element is closed, an adjustable feeder air closing element and/or an adjustable waste heat closing element are open.

6. A cooling system according to claim 5, wherein the control enables an operating mode (C), wherein the recirculated air closing element is open, and the adjustable feeder air closing element and/or the adjustable waste air closing element is closed.

7. A cooling system according to claim 5, wherein the control device enables an operating mode (D), wherein the adjustable recirculated air closing element and the adjustable feeder air closing element and/or the waste air closing element are open.

8. A cooling system according to claim 1, wherein the fan is configured such that air volume circulated by the fan is adjustable.

9. A method for cooling thermally stressed housings or housing parts of a turbine, the method comprising: providing feeder air into the housing; providing a fan in a feeder line of the housing; removing waste air from the housing; and providing means for adjusting a feeder air temperature.

10. A method according to claim 9, wherein more or less waste air is mixed with the feeder air in order to adjust the feeder air temperature.

11. A method according to claim 9, wherein the cooling system includes adjustable components which allow mixing of the waste air with the feeder air in order to adjust the feeder air temperature.

12. A method according to claim 10, wherein the entire waste air is mixed into the feeder air in order to adjust a maximum feeder air temperature.

* * * * *